United States Patent [19]

Abe et al.

[11] 4,335,689

[45] Jun. 22, 1982

[54] ELECTRONIC TYPE AIR/FUEL RATIO CONTROL SYSTEM

[75] Inventors: Osame Abe, Katsuta; Seiji Suda; Toshio Furuhashi, both of Mito, all of Japan

[73] Assignee: Hitachi, Ltd., Tokyo, Japan

[21] Appl. No.: 147,054

[22] Filed: May 6, 1980

[30] Foreign Application Priority Data

May 9, 1979 [JP] Japan .................................. 54-55758

[51] Int. Cl.³ .............................................. F02D 11/10
[52] U.S. Cl. ..................................... 123/339; 123/336; 123/340; 123/344; 123/362; 123/399
[58] Field of Search ............... 123/339, 340, 399, 586, 123/336, 344, 362

[56] References Cited

U.S. PATENT DOCUMENTS

| | | | |
|---|---|---|---|
| 3,964,457 | 6/1976 | Coscia | 123/339 |
| 4,106,451 | 8/1978 | Hattori | 123/586 |
| 4,182,295 | 1/1980 | Zeller | 123/586 |
| 4,237,838 | 12/1980 | Kinugawa | 123/339 |

*Primary Examiner*—Ronald B. Cox
*Attorney, Agent, or Firm*—Craig and Antonelli

[57] ABSTRACT

An electronic type air/fuel ratio control system for use in gasoline engines comprises an accelerator, a detector of the manipulation angle of the accelerator, a shunt conduit by-passing a throttle valve, an air by-pass valve exposed in the shunt conduit for controlling flow rate of by-pass air, and a control circuit. The control circuit is responsive to the output of the accelerator manipulation angle detector and generates a control signal for the air by-pass valve, whereby the air/fuel ratio can be controlled with high accuracy when the flow rate of air is low.

10 Claims, 11 Drawing Figures

FIG. 6 (STEP 524)

FIG. 7 (STEP 532)

FIG. 8 (STEP 530)

FIG. 9
(DETAILS OF STEP 34)

FIG. 10

ELECTRONIC TYPE AIR/FUEL RATIO CONTROL SYSTEM

FIELD OF THE INVENTION

The present invention relates to gasoline engines and more particularly to an electronic type air/fuel ratio control system for use in such engines.

BACKGROUND OF THE INVENTION

The engine has a carburetor for injecting fuel and mixing the same with air. A carburetor conventionally has a means which is controlled mechanically to provide a desired air/fuel ratio. But a carburetor currently used is attached to additional devices for purifying exhaust gas and, for this reason, is complicated. The mechanically complicated carburetor impairs the reliability of the air/fuel ratio control and does not readily perform the matching necessary for maintaining a highly accurate control. Accordingly, the conventional mechanical control type of carburetor requires an improvement in order to maintain a highly accurate air/fuel ratio control with those engine control systems currently being used.

Additionally, in current engine control systems, use is being made of a microcomputer and the microcomputer may also be applied advantageously for air/fuel ratio control in the carburetor.

SUMMARY OF THE INVENTION

An object of the present invention is to provide an electronic type air/fuel ratio control system which can control the air/fuel ratio with high accuracy by accurately controlling the flow rate of air when the flow rate is low.

According to this invention, the above object can be accomplished by an electronic type air/fuel ratio control system comprising an accelerator, means for detecting the manipulation angle of the accelerator, a shunt conduit by-passing a throttle valve, an air bypass valve disposed in the shunt conduit for controlling the flow rate of by-pass air, and a control circuit, responsive to an output of the accelerator manipulation angle detecting means for generating a control signal for controlling the air by-pass valve.

BRIEF DESCRIPTION OF THE DRAWINGS

Other objects, features and advantages of the present invention will become apparent from the following detailed description of preferred embodiment thereof taken in conjunction with the accompanying drawings, in which.

DETAILED DESCRIPTION

The invention will now be described by way of example with reference to the drawings.

Figure 1:
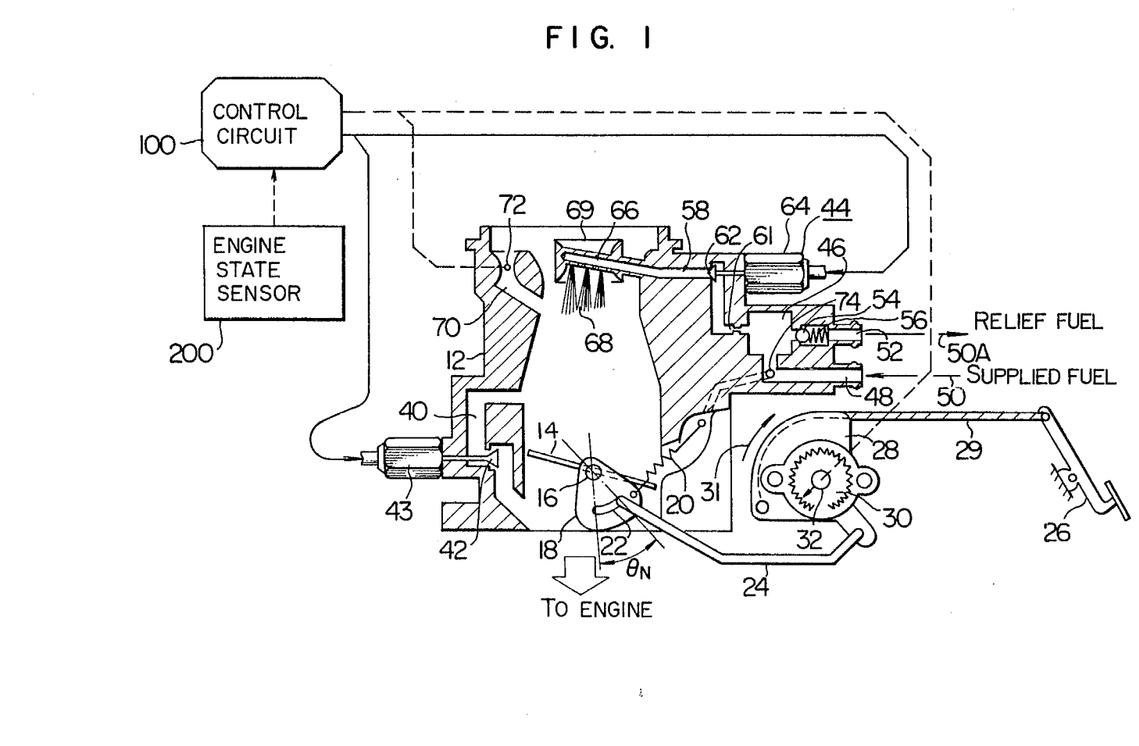
FIG. 1 is a diagrammatic representation showing the construction of an electronic type air/fuel ratio control system embodying the invention.

Referring to FIG. 1, there is shown a preferred embodiment of an electronic type air/fuel ratio control system according to the invention. In the figure, a throttle chamber 12 has a throttle valve 14 which is rotatably mounted thereto by means of a throttle valve rod 16 to control the flow rate of air drawn into the throttle chamber 12. Secured to the throttle valve rod 16 is an adjustment lever 18 through which the throttle valve 14 can be rotated. The adjustment lever 18 takes the form of a sector with its root secured to the throttle valve rod 16 and is biased counterclockwise by a spring 20 fixed to the body of the throttle chamber 12. Formed in the adjustment lever 18 is an elongated accurate opening 22 which subtends a predetermined angle $\theta_N$ about the throttle valve rod 16. This angle $\theta_N$ is effective to produce a lagging motion of the adjustment lever 18 with respect to the manipulation angle of the accelerator. The elongated opening 22 is in engagement with an operating rod 24 which transmits power for rotary motion of the adjustment lever 18. The other end of the operating rod 24 is connected to a drum 28 rotated by an accelerator link 26. The drum 28 is connected to the accelerator link 26 through a wire 29 and is rotated clockwise, as shown at arrow 31, in response to clockwise rotation of the accelerator link 26. Thus, rotary power is transmitted to the adjustment lever 18 through the operating rod 24 and, because of the provision of the elongated opening 22 in the adjust lever 18, the throttle valve rotates when the operating lever 24 moves in excess of the lagging angle $\theta_N$ of the elongated opening 22, thereby permitting air to be drawn into the throttle chamber 12.

The drum 28 carries an accelerator manipulation angle detector or sensor 30 adapted to detect the manipulation angle of the accelerator link 26. The accelerator manipulation angle sensor 30 rotates about a sensor rod 32 in response to the rotation of the drum 28. In particular, the accelerator manipulation angle sensor 30 as exemplified in this embodiment comprises a potentiometer and the rotation of the accelerator link 26 transmitted to the drum 28 is converted into a voltage output delivered from a terminal in the form of the sensor rod 32.

A shunt conduit 40 for by-pass of air flow is formed in the throttle chamber 12 near a portion thereof against which the throttle valve 14 abuts, extending across the throttle valve 14. An air by-pass valve 42 is exposed in the shunt or by-pass conduit 40 for controlling air flowing therethrough. The air bypass valve 42 is controllably driven to be opened and closed by an air solenoid 43.

Upstream of the throttle valve 14, the throttle chamber 12 is provided with a fuel injection unit 44 which injects a predetermined quantity of fuel into chamber 12. The fuel injection unit 44 has a fuel chamber 46 for the storage of the predetermined quantity of fuel, and the bottom of the fuel chamber 46 opens to an inlet port 48 which guides supplied fuel 50. The side of the fuel chamber 46 opens to a relief port 52 which eliminates pulsations in the supplied fuel 50 and returns excessive fuel 50A to a fuel tank (not shown). The relief port 52 houses a relief valve 54 for absorbing pressure fluctuations in the supplied fuel 50. The relief valve 54 is normally closed by a spring 56 but when pressure in fuel 50 overcomes the urging force of the spring 56, it is opened to allow the excessive fuel 50A to return to the fuel tank via the relief port 52. The fuel chamber 46 also opens to a main conduit 58 for guiding the fuel, which main conduit 58 is restricted near the outlet of the fuel chamber 46 by an orifice 61 for regulating the flow rate of the fuel. A fuel injection control valve 62 is provided so as to cooperate with an intermediate portion of the main conduit 58 so as to control fuel flow. The fuel injection control valve 62 is controlled by a fuel solenoid 64 which is energized periodically so that the fuel injection valve 62 is so controlled as to open for a time at a fixed period. The main conduit 58 terminates in an outlet port in the form of a nozzle 66 which lies in the throttle chamber 12. In one side surface of a pipe constituting the nozzle 66 are formed a plurality of injector apertures 68. To facilitate the atomization of the fuel, the nozzle 66 is housed in a small venturi.

A by-pass conduit 70 for by-pass air flow is formed in a portion of the throttle chamber 12 near the nozzle 66 and it extends across the nozzle 66. An air flow rate sensor 72 exposed in the by-pass conduit 70 detects the flow rate of air from which the torque of the engine is derived. The air flow rate sensor 72 electrically detects flow rates of air so that the flow rates of air in the throttle chamber 12 are picked up in the form of voltages. Since the engine torque is a function of engine crankshaft rotation number (i.e. engine speed) and negative pressure, the detection of the air flow rate by the air flow rate sensor 72 provides an indirect measurement of the engine torque. In this sense, the air flow rate sensor 72 constitutes a torque detector.

Downstream of the throttle valve 14, a by-pass conduit for the supply of fuel is formed in the throttle chamber 12. This by-pass conduit extends across the throttle valve 14 and is in communication with a conduit 74 for fuel supply at low speeds which opens to the inlet port 48. The degree of opening of this by-pass conduit is adjusted by a screw not shown.

The solenoids 43 and 64 are controllably driven by a control output of a control circuit 100. More particularly, the control circuit 100 is comprised of a controller such as a microcomputer and fetches the output of the air flow rate sensor 72 and outputs of an engine state sensor 200 which are representative of battery voltage, temperature of engine cooling water, atmospheric pressure, engine speed, oxygen content $O_2$, negative pressure, temperature of atmospheric air, and the like, to produce predetermined outputs which, in turn, are supplied to the solenoids 43 and 64.

Figure 2:
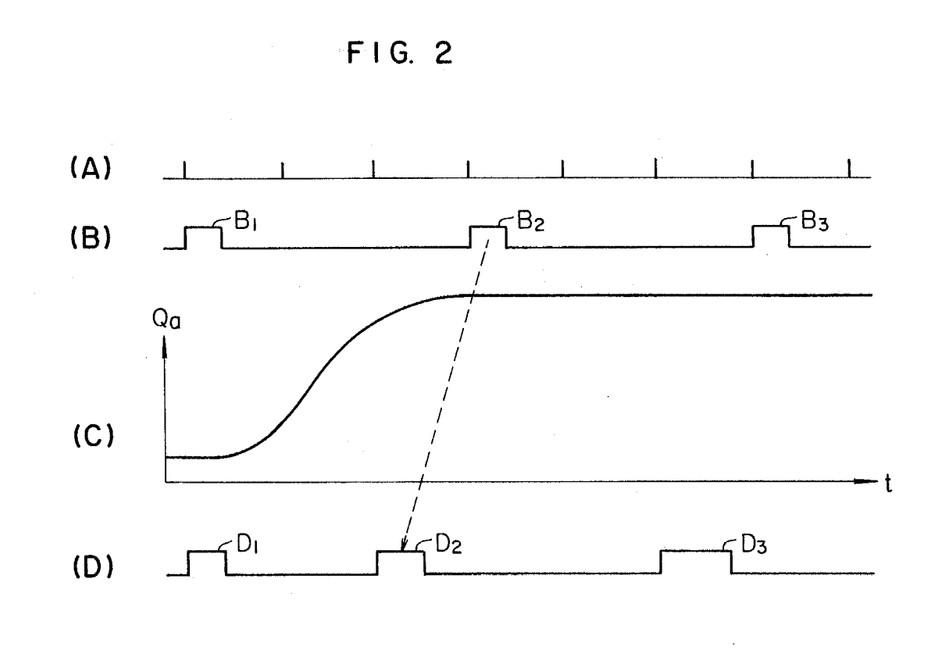
FIG. 2 illustrates, in sections (A) through (D), time charts useful in explaining the operation of the air/fuel ratio control system of FIG. 1 as applied to a six-cylinder engine.

FIG. 2 shows, in the form of time chart, an example of the operation of the air/fuel ratio control system of FIG. 1 when applied to a six-cylinder engine. Reference pulses in proportion to crank rotation angle are illustrated in section (A) and normal driving periods for the solenoid 64, i.e., injection periods for the fuel injection unit 22 occurring in proportion to crank rotation angle are illustrated in section (B). Thus, fuel injections are carried out intermittently corresponding to periods $B_1$, $B_2$ and $B_3$ but averaged over all the periods to assume a smoothed injection as a whole.

If acceleration needs an air flow rate $Q_a$ increasing along a curve as shown in section (C), an earlier occurrence of a period $D_2$ in proportion to the crank rotation angle results, as shown in section (D), thereby increasing the quantity of fuel being injected in the smoothed fashion. The leading period ensures a highly efficient control. Fuel injection during a period $D_3$ is prolonged as compared to that during period $B_3$.

Concurrently therewith, the air by-pass valve 42 is controllably driven to produce a predetermined air/fuel ratio.

As described above, the intake air flow rate $Q_a$ indirectly representative of torque is detected to control the air/fuel ratio, and the quantity of fuel necessary to obtain the air/fuel ratio is injected. At the same time, energization of the solenoid 43 is controlled for switching the air by-pass valve 42 to ensure that the air flow rate drawn through the by-pass conduit 40 can be controlled. Consequently, the air/fuel ratio can be maintained with a high accuracy. Moreover, the periodic and intermittent fuel injections are smoothed as a whole, making it possible to attain a smooth shifting of engine rotation and consequent improvement in running performance.

Although, in the foregoing embodiment, the air flow rate is detected by the air flow rate sensor 72 to indirectly determine torque, the negative pressure detected by a negative pressure sensor may be used for the same purpose. Torque may otherwise be detected directly so as to control the quantity of injection fuel.

Figure 3:
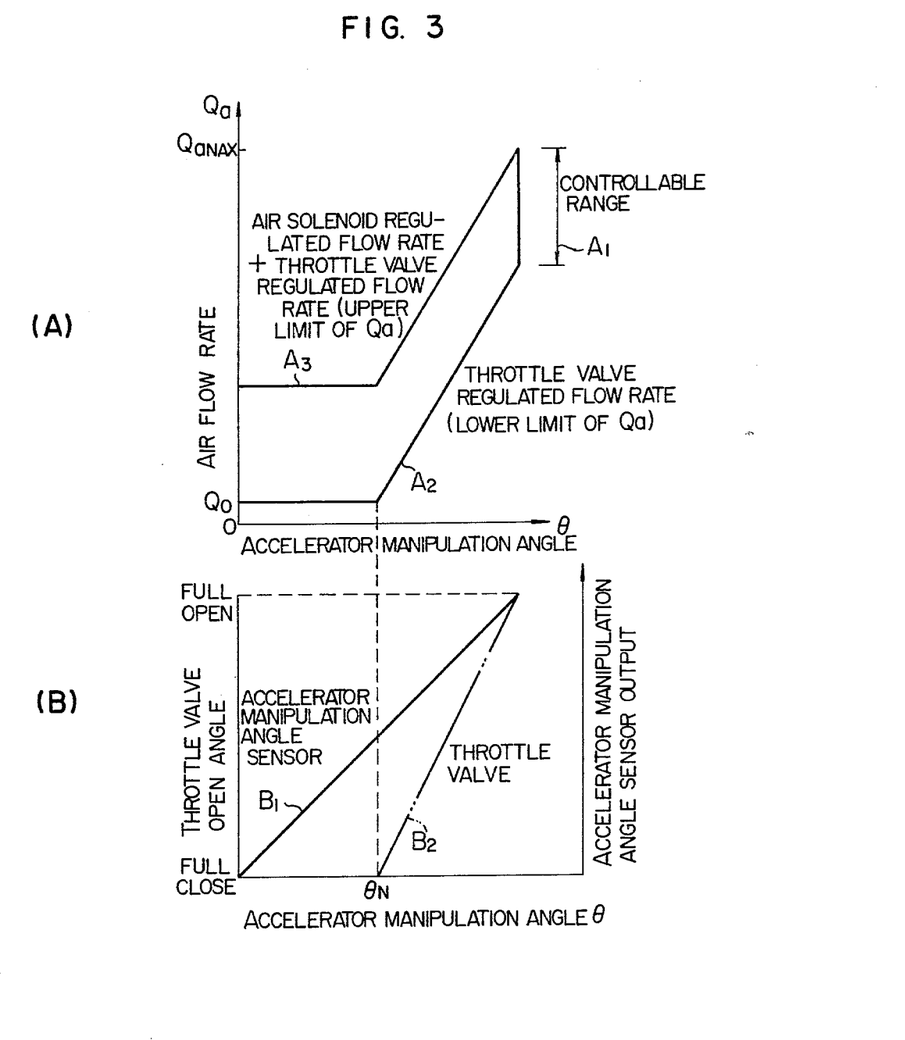
FIG. 3 illustrates, in sections (A) and (B), graphs useful in explaining the operations of the throttle valve and the air by-pass valve.

FIG. 3 shows, in section (A), the relation between accelerator manipulation angle $\theta$ and intake air flow rate $Q_a$. The accelerator manipulation angle $\theta$ is also related to output $B_1$ of the accelerator manipulation angle sensor and open angle $B_2$ of the throttle valve as shown in section (B). It will be seen that the output of the accelerator manipulation angle sensor 30 is in direct proportion to the accelerator manipulation angle $\theta$ while open angle $B_2$ enters into direct proportion to the accelerator manipulation angle $\theta$ after the accelerator manipulation angle exceeds the angle $\theta_N$ subtended by the elongated opening 22 in the adjust lever 18, i.e., the lagging angle. The intake air flow rate $Q_a$ drawn into the throttle chamber 12 on the other hand is controlled within the control range of the air by-pass valve 42 before the accelerator manipulation angle reaches $\theta_N$. In excess of $\theta_N$, throttle valve regulated air flow rate is added to the by-pass air flow drawn into the throttle chamber through the shunt conduit. An air flow control range $A_1$ as shown in section (A) lies between the throttle valve regulated air flow rate as designated at $A_2$ and a sum $A_3$ of the throttle valve regulated air flow rate and the by-pass air flow rate in the by-pass air flow conduit 40. The air flow rate $Q_o$ is the natural flow rate taking place when both the throttle valve 14 and the air by-pass valve 42 are closed and corresponds to a leakage from the throttle chamber 12 through these valves 14 and 42.

Figure 4:
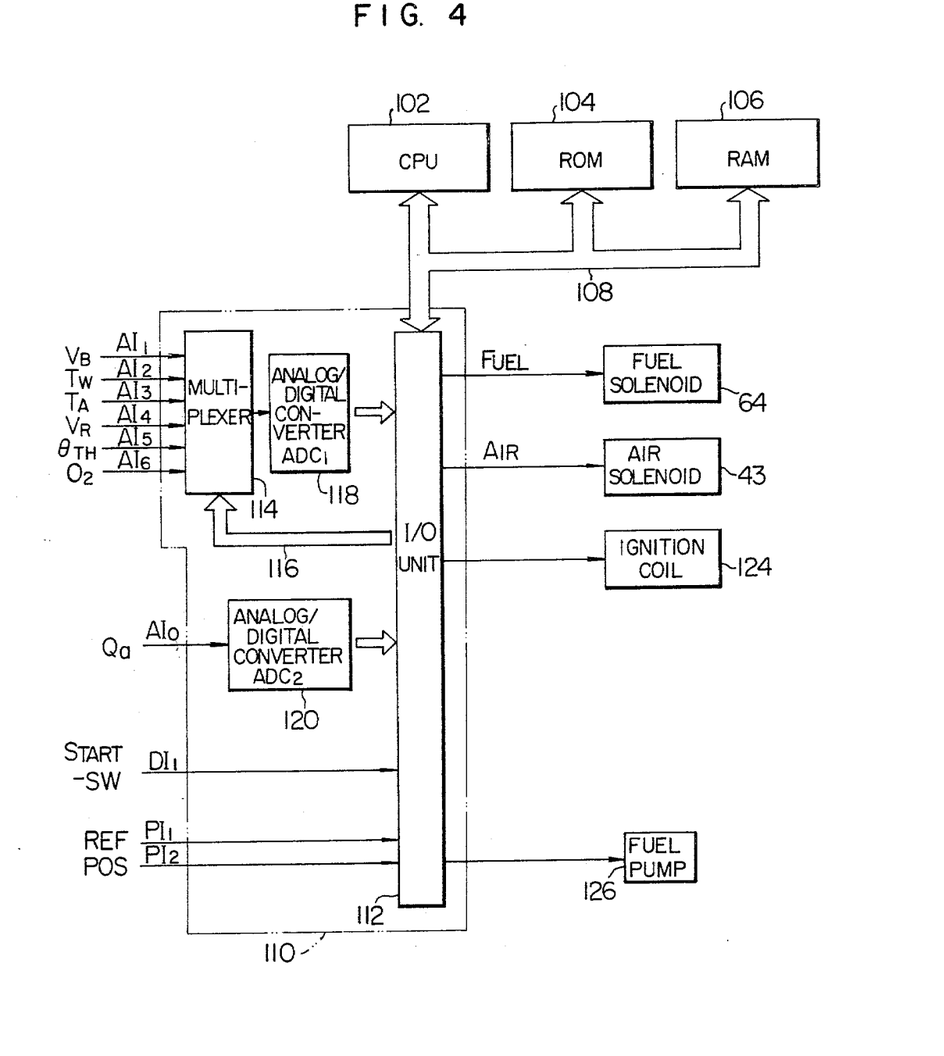
FIG. 4 is a block diagram showing the construction of a control circuit according to the invention.

The control circuit 100 has a construction as described below with reference to FIG. 4. The control circuit comprises a central processing unit (CPU) 102 for digital operation processing, a storage (ROM) 104 for storing a control program and fixed data, and a storage (RAM) 106 capable of reading and writing. The CPU 102, ROM 104 and RAM 106 are connected mutually and to an input/output circuit 112 of an input/output interface circuit 110 by means of a bus 108. The input/output interface circuit 110 fetches outputs of various sensors and produces predetermined control outputs in accordance with the control program. In detail, the outputs of the engine state sensor 200 such as battery voltage $V_B$, temperature $T_W$ of engine cooling water, temperature $T_A$ of atmospheric air, adjusting signal $V_R$, accelerator manipulation angle $\theta_{TH}$ and oxygen content $O_2$ are supplied to a multiplexer (MPX) 114. These outputs of the sensor 200 are selected on a time-shared basis by control signals sent from the input/output circuit 112 of the input/output interface circuit 110 via a bus 116 and fed to an analog-digital converter (ADC 1) 118 wherein they are converted into digital values suited for delivery to the input/output circuit 112. Also applied to the input/output circuit 112 are a digital value of output $Q_a$ of the air flow rate sensor 72 resulting from conversion of the output $Q_a$ at an analog-digital converter (ADC 2) 120, on-off signal $DI_1$ of a starter switch, reference crank angle signal $PI_1$ and position pulse signal $PI_2$. The input/output circiut 112 sends these sensor outputs to the CPU 102 and receives in turn therefrom control signals for delivery to the solenoids 64 and 43, ignition coil 124 and fuel pump 126. The adjusting signal $V_R$ in this embodiment is generated from a variable resistor, for example, and is used to adjust the quantities to be controlled.

With the above construction, when the control circuit 100 fetches the output $Q_a$ of the air flow rate sensor 72 and the outputs of the engine state sensor 200 including $V_B$, $T_W$, $T_A$, $V_R$, $\theta_{TH}$ and $O_2$, the CPU 102 carries out operation processing according to the predetermined control program to obtain the air/fuel ratio on which the input/output circuit 112 of the input/output interface circuit 110 is based to produce the control outputs to be applied to the solenoids 64 and 43.

A program for the control circuit 100 which is used to obtain control parameters for the by-pass air flow rate $Q_{aB}$ in the air flow by-pass conduit 40, that is, for the air by-pass valve 42 will be described with reference to FIG. 5.

Figure 5:
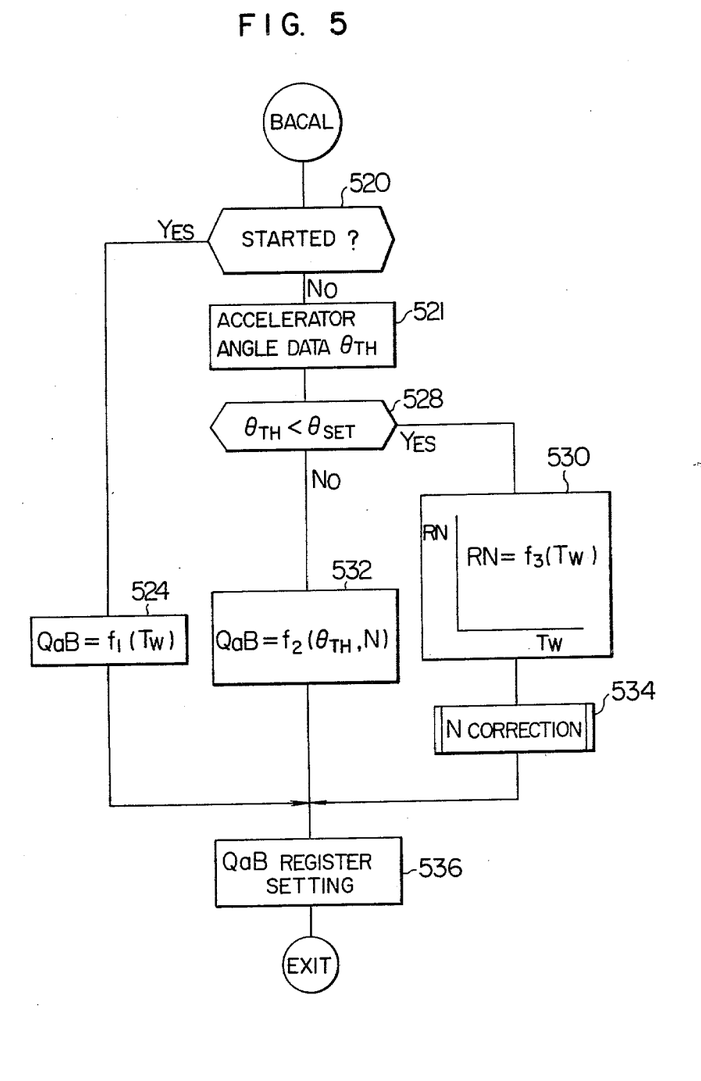
FIG. 5 is a flow chart useful in explaining a computing program for air flow rate according to the invention.
Figure 6:
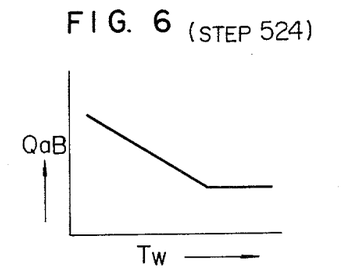
FIG. 6 illustrates graphically a characteristic of by-pass air flow rate versus water temperature.

In the control flow chart for the air by-pass valve as shown in FIG. 5, execution of a task is requested and performed at a period selected from 50 to 150 msec. The manner of setting and performing the execution request is detailed in Japanese Patent Application Nos. 40901/'79 and 70067/'79 and only the computing program directly related to the present invention will be described herein. In step 520, the on-off position of the starter switch is determined and the program proceeds to step 524 when "ON" is identified, to indicate that the operation is started. A function $f_1(T_W)$ as shown in step 524 is a function of water temperature which is graphically illustrated in FIG. 6. Thus, $Q_{aB}$ is determined from a characteristic of FIG. 6. Actually, a valve-open duration for the solenoid 43 is determined in accordance with $Q_{aB}$ and set into the input/output circuit 112 in step 536.

Figure 8:
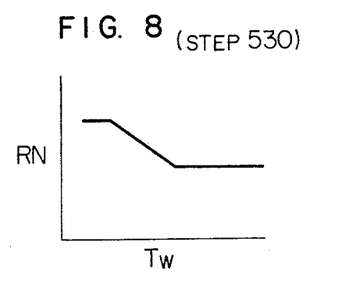
FIG. 8 illustrates graphically a characteristic of target rotation number versus water temperature.
Figure 9:
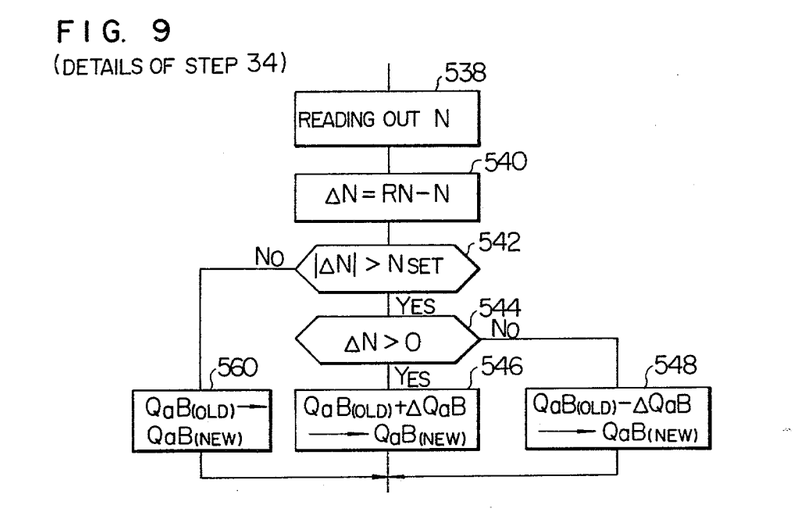
FIG. 9 is a flow chart showing details of a program for step 34 in the flow chart shown in FIG. 5.

When "NO" is identified in step 520, to indicate that the operation is not started, accelerator manipulation angle data $\theta_{TH}$ is read out of the RAM in step 521. The data $\theta_{TH}$ applied via the multiplexer (MPX) 114 to the analog-digital converter (ADC 1) 118 is digitized thereat and stored in RAM 106. As the multiplexer (MPX) 114 and the analog-digital converter (ADC 1) 118 are operated every 10 msec., all the data in storage are sequentially fetched in the form of inputs $AI_1$ to $AI_6$ of this order. Accordingly, 60 msec. is required for fetching all of the inputs $AI_1$ to $AI_6$ and $\theta_{TH}$ is fetched at a period of 60 msec. and set into the RAM 106. For further details, one may refer to Japanese Patent Applications Nos. 40901/'79 and 70067/'79 set forth above. The data $\theta_{TH}$ read out of the RAM in step 521 is compared with a fixed reference $\theta_{SET}$. When $\theta_{TH}$ is smaller than $\theta_{SET}$, step 528 indicates "YES" in which the engine is in idling condition. Accordingly, correction for engine rotation speed is carried out in steps 530 and 534. To this end, a target rotation number RN is determined from a function $f_3(T_W)$ in step 530, which function is characteristic of water temperature $T_W$ and target rotation number RN as shown in FIG. 8. By using the target rotation number RN determined from the characteristic of FIG. 8, the setting of $Q_{aB}$ and the determination of the opening of the air by-pass valve 42 are carried out in step 534 such that the actual rotation number N coincides with the target rotation number RN. The result is set into a register in step 536. To detail the execution in step 534 with reference to FIG. 9, the actual rotation number N is fetched in step 538 and the difference $\Delta N$ between the rotation number N and the target rotation number RN is obtained in step 540. The difference $\Delta N$ is compared with a fixed reference $N_{SET}$ and when larger, the execution proceeds to step 544. In step 544, the sign (positive or negative) of $\Delta N$ is determined. When $\Delta N$ is positive, that is, RN > N, the $Q_{aB}$ is increased to cause the actual engine rotation number (or speed) N to approximate the target roration number (or speed) RN. To this end, the previous $Q_{aB}$ (old) is added to a fixed $\Delta Q_{aB}$ to produce an updated $Q_{aB}$ (new) and the new $Q_{aB}$ is set into the register in step 536.

Figure 7:
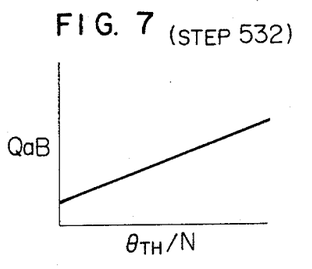
FIG. 7 illustrates graphically a characteristic of by-pass air flow rate versus throttle opening/engine speed ratio.

When $|\Delta N|$ is determined to be smaller than the $N_{SET}$, the previous $Q_{aB}$ (old) is retained as an updated $Q_{aB}$ (new) and this new $Q_{aB}$ is set into the register in step 536. When it is determined that $\theta_{TH}$ is larger than $\theta_{SET}$ in step 528 of FIG. 5, indicating that the accelerator is depressed, $Q_{aB}$ is determined in compliance with the relation between the throttle opening and the engine speed as shown in FIG. 7. The thus determined $Q_{aB}$ is set into the register in step 536.

Figure 10:
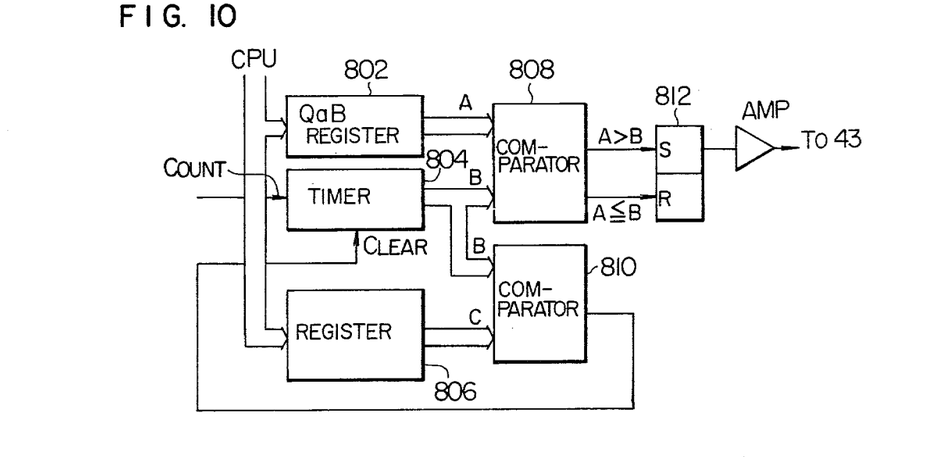
FIG. 10 is a block diagram of a circuit for controlling air solenoid 43 shown in FIG. 1.

FIG. 10 shows a circuit, incorporated in the input/output circuit 112, for controlling the air bypass valve 42. The $Q_{aB}$ representative of duty is set into a register 802 in step 536. A fixed period is set into a register 806. A timer 804 comprised of a counter circuit counts clock pulses. Count B of the clock pulses is compared with value C of the register 806 at a comparator 810 and when the count B exceeds the value C, the timer 804 is cleared. Accordingly, the timer 804 repeats counting at a period which is determined by the value C of the register 806. The count of the timer 804 is also compared with value A of the register 802 at a comparator 808. Under the condition that the value A of the register 802 is larger than the count B of the timer 804, a flip-flop 812 is set, whereas for the count B in excess of the value A, the flip-flop 812 is reset. Accordingly, the set time of the flip-flop 812 is determined by the value A of the register 802. By increasing the value A, the set time of the flip-flop 812 can be prolonged. Since the timer 804 repeats counting at a frequency corresponding to the set value of the register 806, delivery of the set output of the flip-flop 812 is repeated at a repetition period corresponding to the set value of the register 806.

While, in the foregoing embodiment, fuel is injected into the throttle chamber 12 upstream of the throttle valve 14, the present invention is not limited to such a type of fuel injection and may be applied to an engine of the type wherein fuel is injected into an intake manifold.

As has been described above, according to this invention, the air flow rate can be controlled with high accuracy by an air by-pass valve exposed in the air flow by-pass conduit across the throttle valve when the air flow rate is low, to ensure that the air/fuel ratio can be controlled with high accuracy. Conversely, such a highly accurately controlled air/fuel ratio requires a highly accurately controlled air flow rate which contributes to smooth starting of engine and improved running performance.

Figure 11:
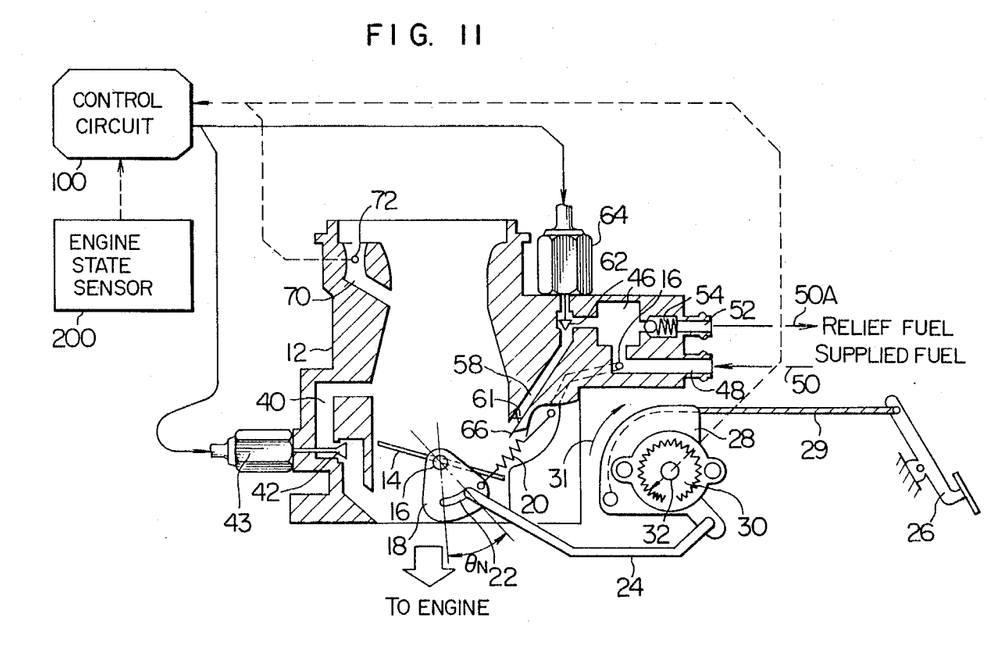
FIG. 11 is a diagrammatic representation, similar to FIG. 1, showing another embodiment of electronic type air/fuel ratio control system according to the invention.

FIG. 11 shows another embodiment of this invention, in which the same elements in FIG. 1 are designated by the same reference numerals. Different from the FIG. 1 embodiment, this embodiment of FIG. 11 comprises a nozzle 66 by way of which fuel is injected near the throttle valve in contrast to upstream of the throttle valve. The fuel injection effected upstream of the throttle valve as in the FIG. 1 embodiment is, however, more effective for the atomization of fuel than the fuel injection according to the FIG. 11 embodiment.

What is claimed is:

1. An electronic type air/fuel ratio control system comprising an accelerator, means for detecting a manipulation angle of said accelerator, a shunt conduit by-passing a throttle valve, an air by-pass valve disposed in said shunt conduit for controlling flow rate of by-pass air, and a control circuit responsive to an output of said accelerator manipulation angle detecting means to generate a control signal for controlling said air by-pass valve, and which further comprises means for opening said throttle valve in proportion to the accelerator manipulation angle when said accelerator is operated in excess of a predetermined manipulation angle, and wherein said throttle valve opening means comprises a link mechanism interlocking said throttle valve and said accelerator, and means for inhibiting interlocking of said accelerator with said throttle valve until said accelerator manipulation angle reaches a predetermined value.

2. An electronic type air/fuel ratio control system comprising: an accelerator manipulated by an operator; a throttle valve controllably interlocked with said accelerator through interlocking means and for controlling air supplied to an engine; a shunt conduit by-passing said throttle valve; an air by-pass valve disposed in said shunt conduit; and a control circuit for providing to said air by-pass valve a control signal for adjusting an amount of air flow through said shunt conduit, and wherein said interlocking means comprises
    means for inhibiting the interlocking of said accelerator with said throttle valve while said accelerator is deviated from a first position of said accelerator corresponding to the minimum opening of said throttle valve to a second position of said accelerator corresponding to a predetermined manipulated opening of said throttle valve,
    accelerator manipulation angle detecting means for detecting an accelerator manipulation angle and generating an accelerator manipulation electric signal representative thereof, and wherein
wherein when said inhibiting means functions, said accelerator manipulation signal is inputted into said control circuit and a control signal from said control circuit corresponding to said accelerator manipulation electric signal is provided to said air by-pass valve for adjusting the amount of air flow through said shunt conduit.

3. For use in an electronic-type air/fuel ratio control system for an internal combustion engine having a main throttle valve for controlling the flow of air to the engine, a shunt conduit by-passing said main throttle valve, an air by-pass valve disposed in said shunt conduit for controlling the flow rate of by-pass air therethrough, an accelerator link arrangement, coupled between said main throttle valve and an accelerator, for operating said main throttle valve in response to the operation of said accelerator, and a control circuit, responsive to the operation of said accelerator, for generating a control signal for controlling said air by-pass valve,
    an accelerator link interlock control arrangement comprising:
        first means, coupled to said accelerator link arrangement, for generating an accelerator manipulation angle signal representative of the manipulation angle of said accelerator and supplying said accelerator manipulation angle signal to said control circuit in response to which said control signal is adjusted; and
        second means, coupled within said accelerator link arrangement, for inhibiting the operation of said main throttle valve by the operation of said accelerator until said accelerator manipulation angle reaches a predetermined value.

4. A system according to claim 1 which comprises means disposed between said accelerator and said link mechanism, for driving said accelerator manipulation angle detecting means.

5. A system according to claim 4 wherein said accelerator manipulation angle detecting means comprises a potentiometer.

6. An electronic-type air/fuel ratio control system according to claim 2, wherein said interlocking means further comprises a first link connected to said accelerator, and a second link connected to said first link and said throttle valve, and wherein said inhibiting means comprises said first link and an idler mechanism disposed in a portion at which said first link is connected to said second link.

7. An electronic-type air-fuel ratio control system according to claim 2, wherein said accelerator manipulation angle detecting means comprises a potentiometer.

8. An electronic-type air/fuel ratio control system according to claim 2, wherein said interlocking means further comprises
    a wire connected to said accelerator,
    a drum for converting the movement of said wire connected to said accelerator into rotational movement,
    a link for converting rotational movement of said drum connected to said wire into linear movement, and
    a lever fixed to the shaft of said throttle valve for converting the linear movement of said link connected to said drum into rotational movement, to thereby rotate said throttle valve, and wherein said inhibiting means comprises an elongated opening which is disposed in said lever and engaged with said link.

9. An accelerator link interlock control arrangement according to claim 3, wherein said accelerator link arrangement comprises a first link connected to said accelerator and a second link coupled to said first link and said main throttle valve, and wherein said second means includes means for permitting relative movement of said first and second links without corresponding movement of said main throttle valve.

10. An accelerator link interlock control arrangement according to claim 9, wherein said first means comprises a potentiometer.

* * * * *